(12) United States Patent
Spatafora et al.

(10) Patent No.: US 6,732,497 B1
(45) Date of Patent: May 11, 2004

(54) CIGARETTE PACKING MACHINE

(75) Inventors: Mario Spatafora, Bologna (IT); Fabrizio Tale', Bologna (IT)

(73) Assignee: G.D Societa' per Azioni, Bologna (IT)

( * ) Notice: Subject to any disclaimer, the term of this patent is extended or adjusted under 35 U.S.C. 154(b) by 103 days.

(21) Appl. No.: 09/607,401

(22) Filed: Jun. 30, 2000

(30) Foreign Application Priority Data

Jun. 30, 1999 (IT) .................................... BO99A0352

(51) Int. Cl.[7] .......................... B65B 1/06; B65B 19/12
(52) U.S. Cl. ................................... 53/493; 53/151
(58) Field of Search ....................... 53/493, 149, 150, 53/151

(56) References Cited

U.S. PATENT DOCUMENTS

| | | | |
|---|---|---|---|
| 3,707,219 A | | 12/1972 | Seragnoli |
| 3,749,025 A | * | 7/1973 | Giraud .......................... 104/25 |
| 3,863,658 A | * | 2/1975 | Kramb et al. ................ 134/131 |
| 3,917,054 A | * | 11/1975 | Hurst .......................... 198/381 |
| 4,596,107 A | * | 6/1986 | Pfleger, Sr. ............. 198/370.03 |
| 4,731,567 A | * | 3/1988 | Dands et al. ................ 198/794 |
| 4,800,818 A | * | 1/1989 | Kawaguchi et al. ......... 104/290 |
| 5,070,991 A | * | 12/1991 | Hinchcliffe et al. ....... 198/418.3 |
| 5,284,001 A | * | 2/1994 | Ochs ............................ 53/307 |
| 5,464,027 A | * | 11/1995 | Bina et al. .................... 131/282 |
| 5,494,172 A | * | 2/1996 | Siesco, Jr. ................... 209/212 |
| 5,720,377 A | * | 2/1998 | Lapeus et al. ............ 198/346.1 |
| 5,730,277 A | * | 3/1998 | Meinke et al. .............. 131/281 |
| 5,878,865 A | * | 3/1999 | Bailey et al. ............. 198/459.8 |
| 5,996,310 A | * | 12/1999 | Bailey et al. .................. 53/176 |
| 6,006,492 A | * | 12/1999 | Draghetti ..................... 131/283 |
| 6,065,390 A | * | 5/2000 | Florindez ..................... 198/431 |
| 6,168,003 B1 | * | 1/2001 | Wacker ................... 198/341.01 |
| 6,283,039 B1 | * | 9/2001 | Takayanagi et al. ......... 104/292 |

FOREIGN PATENT DOCUMENTS

EP           0 425 021 A1     5/1991

* cited by examiner

*Primary Examiner*—Rinaldi I. Rada
*Assistant Examiner*—Gloria R Weeks
(74) *Attorney, Agent, or Firm*—Marshall, Gerstein & Borun LLP

(57) ABSTRACT

A packing machine for packing cigarettes, having a conveyor in turn having at least one pocket for forming and conveying a respective group of cigarettes; the pocket being carried by a carriage run along a fixed guide by a linear electric motor, a stator or primary of which extends along at least one portion of the guide, and a cursor or secondary of which is carried by the carriage.

21 Claims, 3 Drawing Sheets

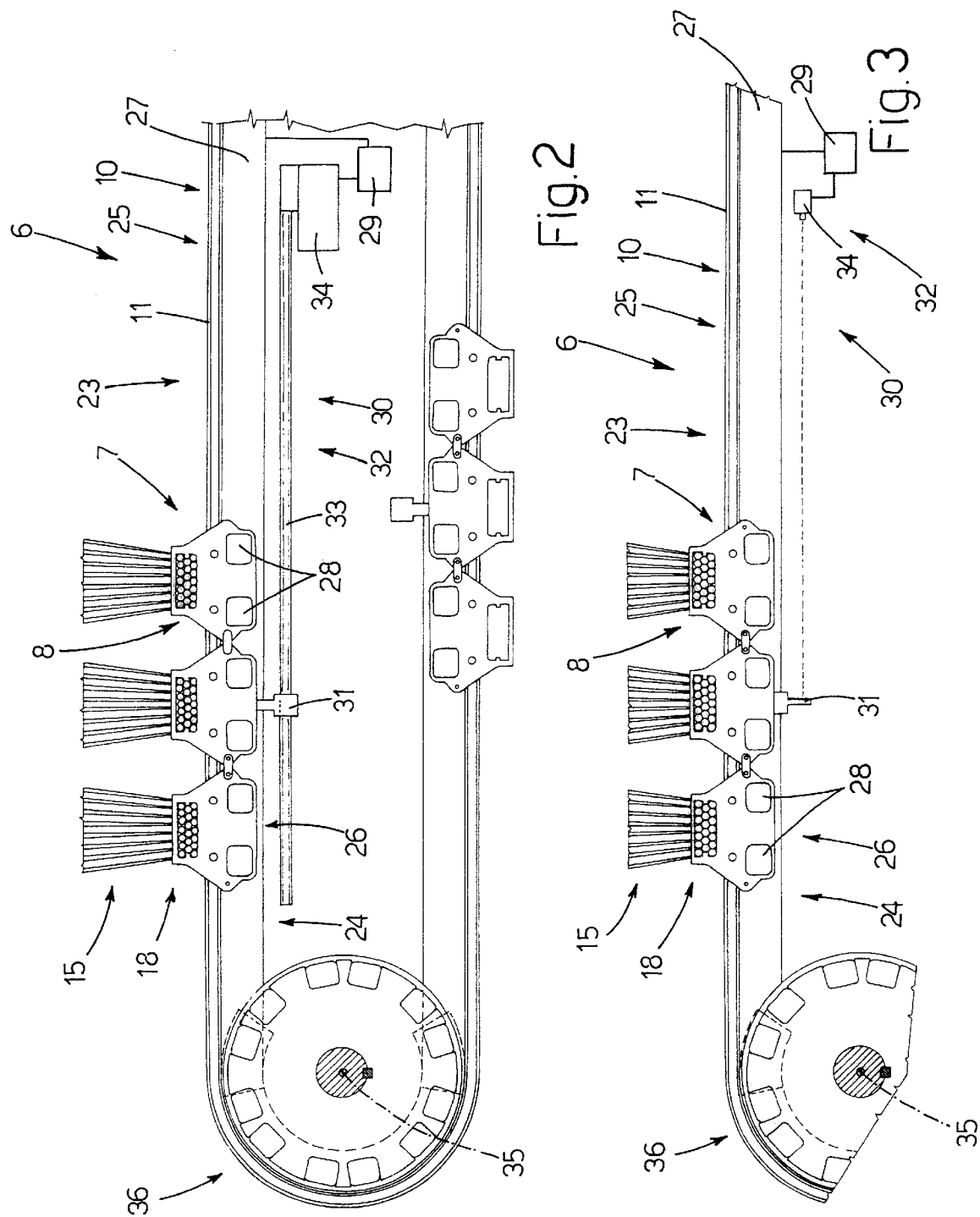

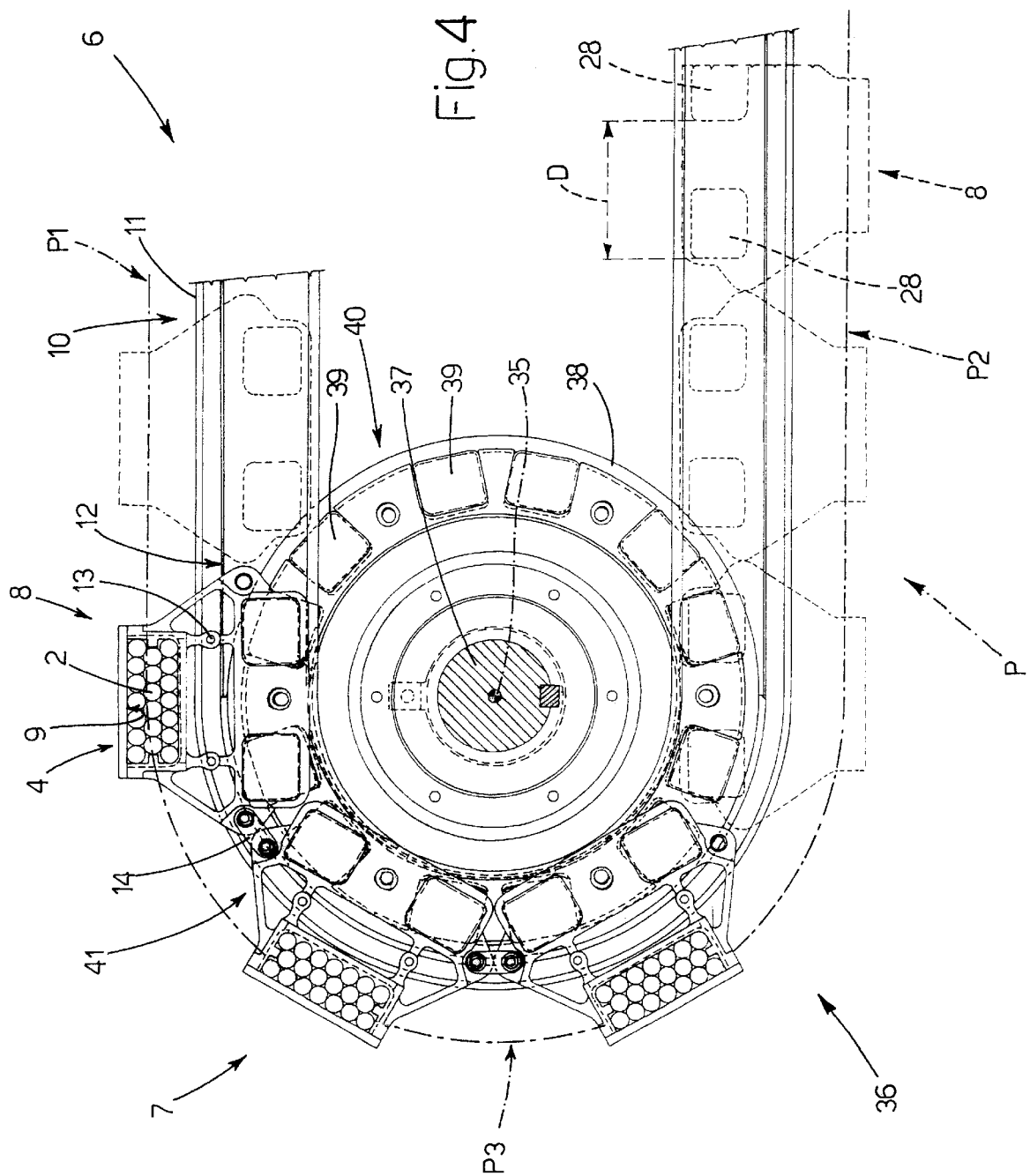

CIGARETTE PACKING MACHINE

The present invention relates to a cigarette packing machine.

BACKGROUND OF THE INVENTION

Known cigarette packing machines, such as the type described in U.S. Pat. No. 3,707,219, comprise a conveyor for step feeding a number of forming and conveying pockets along a path extending parallel to a number of hopper outlets. At each stop of the conveyor, a reciprocating pusher extracts one or more layers of cigarettes from each outlet of the hopper into a respective pocket arrested in front of the hopper; which operation may be repeated at successive stops of the conveyor until a complete group of cigarettes defining the content of a packet is formed inside each pocket.

At a transfer station, the complete groups are extracted successively from the conveyor pockets onto a step-operated or continuous wrapping unit.

Though perfectly functional, group-forming units of the type described above have the drawback of being unable to operate at relatively high speed, on account of intermittent operation of the conveyor, and the difficulty posed in connecting the unit to a continuous wrapping unit. Moreover, such forming units also have a relatively high noise level.

SUMMARY OF THE INVENTION

It is an object of the present invention to provide a cigarette packing machine designed to eliminate the aforementioned drawbacks, and which, in particular, is straightforward mechanically.

According to the present invention, there is provided a cigarette packing machine comprising a conveyor having at least one pocket for forming and conveying a respective group of cigarettes; the machine being characterized in that said conveyor comprises a fixed guide; at least one carriage running along said guide and supporting said pocket; and a linear electric motor having a stator or primary located along at least a portion of the guide, and a cursor or secondary carried by said carriage.

BRIEF DESCRIPTION OF THE DRAWINGS

A number of non-limiting embodiments of the present invention will be described by way of example with reference to the accompanying drawings, in which:

FIGS. 2 and 3 show side views of two different embodiments of the FIG. 1 machine;

FIG. 4 shows a larger-scale side view, with parts removed for clarity, of a detail of the conveyor in FIG. 1, 2 or 3.

DETAILED DESCRIPTION OF THE INVENTION

Figure 1:
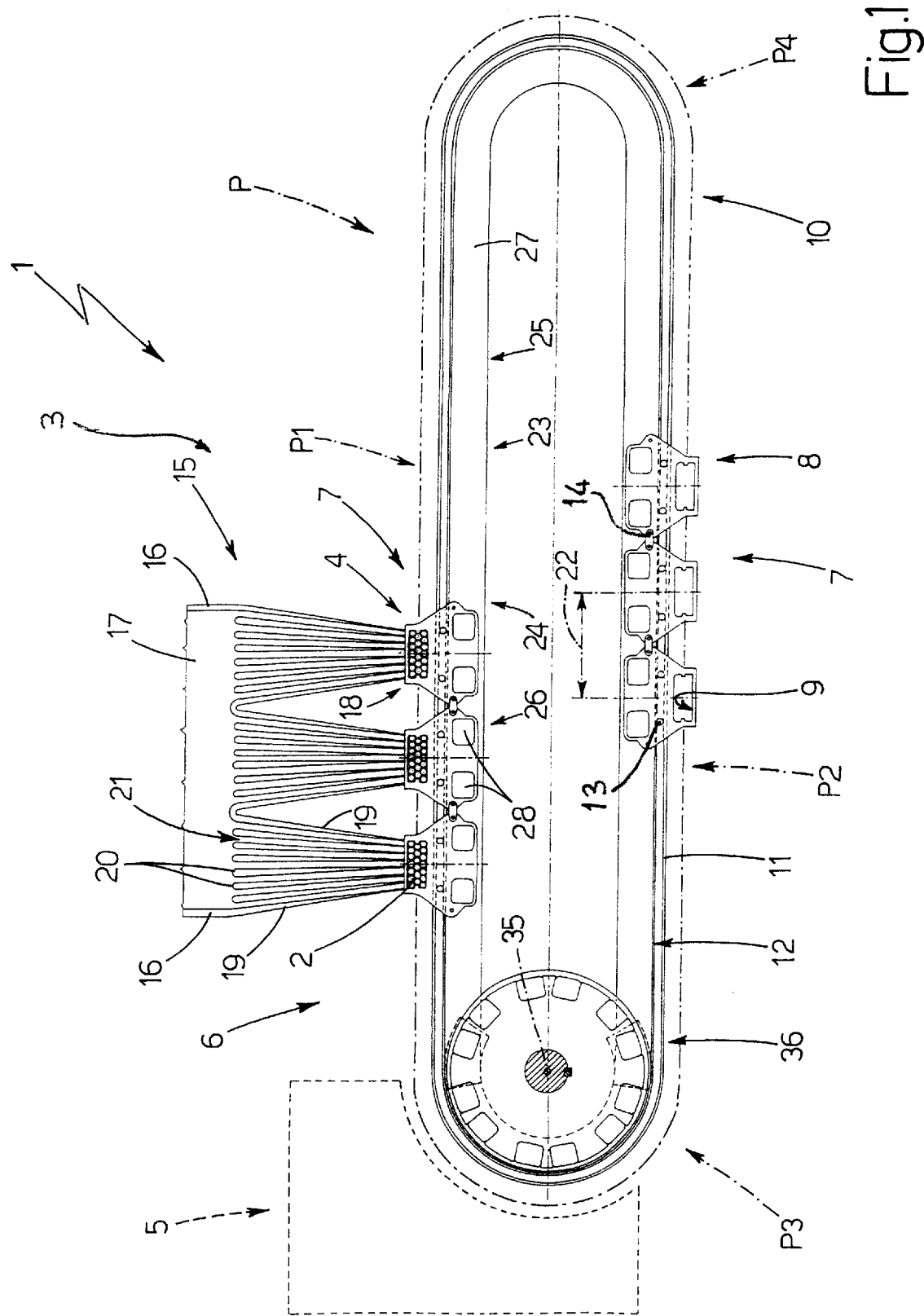
FIG. 1 shows a schematic side view, with parts removed for clarity, of a packing machine in accordance with the present invention.

Number 1 in FIG. 1 indicates as a whole a machine for packing cigarettes 2, and comprising a forming unit 3 for forming groups 4 of cigarettes 2, and a known wrapping unit 5 (shown in block form in FIG. 1).

Unit 3 comprises a conveyor 6 in turn comprising two trains 7 of three carriages 8, each of which supports a respective pocket 9 for housing a respective group 4 of cigarettes 2. Each carriage 8 runs along a fixed endless guide 10 defining an endless path P lying in the FIG. 1 plane and having two straight, parallel, horizontal portions P1 and P2 connected to each other by two semicircular portions P3 and P4. Guide 10 of conveyor 6 comprises a pair of parallel rails 11 (only one shown in FIG. 1) in which are defined respective grooves 12 engaged transversely and in sliding manner by pins 13 on each carriage 8.

The three carriages 8 in each train 7 are connected mechanically to one another by means of respective arms 14, each of which is hinged at opposite ends to the facing ends of a respective pair of adjacent carriages 8 to enable carriages 8 to rotate with respect to each other along the curved portions of path P.

Forming unit 3 comprises a hopper 15 containing a mass (not shown) of cigarettes 2 oriented with their respective axes (not shown) perpendicular to path P and to the FIG. 1 plane. Hopper 15 comprises two lateral walls 16; a front wall (not shown); a rear wall 17; and three outlets 18, each of which is defined by two lateral walls 19 and by a number of partitions 20 which, together with walls 19, define a number of substantially vertical downfeed channels 21 for cigarettes 2. Each outlet 18 is defined in known manner at the bottom end by a respective horizontal platform (not shown) on which the cigarettes 2 issuing from respective channels 21 come to rest to form a respective orderly group 4.

Outlets 18 are arranged with a given spacing 22 along portion P1 of path P, and pockets 9 of each train 7 are also arranged with the same spacing 22 so that, when train 7 is set to a loading position in front of hopper 15, each pocket 9 is positioned facing and aligned with a respective outlet 18, and groups 4 of cigarettes 2 inside respective outlets 18 may be fed into respective pockets 9 by means of a known extracting device (not shown), in particular a reciprocating pusher.

In an alternative embodiment not shown, the number N of outlets 18 of hopper 15 is other than three, and in particular is a multiple of the number of pockets 9 in each train 7. In yet a further embodiment not shown, the known extracting device (not shown) feeds only one layer of cigarettes 2 at a time into a respective pocket 9, so that each pocket 9 must be arrested successively in front of three different outlets 18 to receive a respective layer of cigarettes 2 from each.

Along portions P1, P2 and P4 of path P, carriages 8 are run along guide 10 by an actuating device 23 comprising a linear electric motor 24 having a primary or stator 25 located along guide 10, and a series of secondaries or cursors 26, each carried by a respective carriage 8. In an alternative embodiment not shown, each train 7 is provided with only one secondary 26 carried by a drive carriage 8, which drives the other nonpowered carriages 8.

In the preferred embodiment shown in the accompanying drawings, primary 25 of linear electric motor 24 comprises a pair of longitudinal members 27 (only one shown in the accompanying drawings) extending parallel to and inside rails 11, and supporting a series of known electric windings (not shown) for generating a variable magnetic field between members 27; each secondary 26 comprises a pair of permanent magnets 28 spaced a given distance D apart and connected mechanically to a respective carriage 8 so as to be located between members 27; and the gap between magnets 28 and members 27 is relatively small (about 1–2 millimeters) to achieve relatively powerful driving forces on carriages 8 while at the same time preventing magnets 28 from sliding against members 27.

As shown in FIGS. 2 and 3, actuating device 23 also comprises a control unit 29, which drives the windings of primary 25 by means of a closed-loop (i.e. feedback) control system; for which purpose, control unit 29 is connected to a sensor 30 for detecting, instant by instant, the position of each carriage 8 or each train 7 of carriages 8 along path P.

Sensor 30 comprises a reference member 31 carried by one carriage 8 in each train 7; and a fixed reading system 32 connected to reference member 31. In an alternative embodiment not shown, each carriage 8 carries a respective reference member 31 for redundant control of the position of trains 7 along path P.

In one embodiment shown in FIG. 2, reference member 31 is defined by a permanent magnet connected magnetically to a bar 33 of magnetostrictive material forming part of reading system 32, which comprises a measuring unit 34 connected to one end of bar 33 to accurately determine the position of member 31 and, hence, of respective train 7.

More specifically, measuring unit 34 produces a mechanical stress which travels like a sound wave along bar 33; at member 31, bar 33 is of uneven shape on account of the magnetostrictive effect induced by the magnetic field produced by member 31; and the unevenness produces in the sound wave a reflection component which travels, at the speed of sound in bar 33, back to measuring unit 34, which determines the distance between itself and reference member 31 by measuring the time interval between the instant the wave is emitted and the instant the reflected component is received.

In an alternative embodiment shown in FIG. 2, reference member 31 is defined by a permanent magnet connected magnetically to a bar 33 forming part of reading system 32 and having a number of known magnetoresistors (not shown) equally spaced along bar 33 with a relatively small spacing; and reading system 32 comprises a measuring unit 34 connected electrically to one end of bar 33 to accurately determine the position of member 31 and, hence, of respective train 7 by cyclically measuring the resistance value of the magnetoresistors on bar 33, and so determining the point at which the resistance value changes as a result of the magnetic field produced by reference member 31.

In an alternative embodiment shown in FIG. 3, reference member 31 is defined by a reflecting prism for reflecting a laser light pulse emitted by a measuring unit 34, which forms part of reading system 32 and provides for determining the distance between itself and reference member 31 by measuring the time interval between the instant the laser pulse is emitted and the instant the reflected component is received.

A sensor 30 comprising a magnet 31 connected to a bar 33 of magnetostrictive material, or to a bar 33 with magnetoresistors, may be used to determine the position of a train 7 along straight path portions such as P1 and P2, as well as along nonstraight path portions such as P4; whereas a sensor 30 comprising a prism 31 connected to a laser emitter 34 may only be used to determine the position of a train 7 along straight path portions such as P1 and P2.

Sensors 30 as described above provide for controlling the position of a train 7 of carriages 8 along path P to a fairly high degree of accuracy, as required along the portions of path P in which pockets 9 carried by train 7 are called upon to cooperate with other parts of packing machine 1, such as hopper 15 and wrapping unit 5.

Along other portions of path P (e.g. P2 and P4), on the other hand, train 7 of carriages 8 simply travels through with no interaction with other parts of packing machine 1, so that other known types of sensors 30 (less precise but cheaper) may be used along such portions of path P to determine the position of train 7 and generate the feedback signal to control unit 29. Alternatively, along such portions of path P, control unit 29 may drive primary 25 by means of an open-loop control system (i.e. with no feedback signal).

Along semicircular portion P3 extending about a horizontal central axis 35 perpendicular to the FIG. 1 plane, each carriage 8 cooperates with, and transfers a respective group 4 of cigarettes 2 to, wrapping unit 5. Along portion P3, therefore, the law of motion of each train 7 of carriages 8 must be extremely precise, in that any error in the positioning of a carriage 8 may result in damage to the known transfer members (not shown) of wrapping unit 5. For this reason, whereas, along portions P1, P2 and P4 of path P, carriages 8 are fed along guide 10 by actuating device 23, trains 7 of carriages 8 are fed along portion P3 by a timing device 36, which provides for feeding each train 7 along portion P3 with a given law of motion and in time with the known transfer members (not shown) of wrapping unit 5 cooperating with carriages 8 along portion P3.

As shown in FIG. 4, timing device 36 comprises a powered shaft 37 coaxial with axis 35; and two disks 38 (only one shown in FIG. 4) fitted to shaft 37 and each supporting a number of permanent magnets 39, each facing a permanent magnet 39 on the other disk 38. Magnets 39 of each disk 38 are divided into pairs 40 equally spaced along disk 38 with the magnets 39 in each pair 40 separated by a distance equal to distance D; and disks 38 define, in between, a semicircular passage 41 through which travels the bottom portion of each carriage 8 supporting permanent magnets 28.

Operation of packing machine 1 will now be described with reference to FIGS. 1 and 4, and to one train 7 of three carriages 8 traveling along portion P2 of path P.

Actuating device 23 moves train 7 successively, and at substantially constant speed, along straight portion P2, semicircular portion P4, and straight portion P1 up to hopper 15, in front of which, actuating device 23 stops train 7 temporarily in said loading position wherein each pocket 9 is positioned facing and aligned with a respective outlet 18, and wherein groups 4 of cigarettes 2 in respective outlets 18 are fed into respective pockets 9 by said known extracting device (not shown).

Actuating device 23 then accelerates train 7 along the rest of portion P1 towards timing device 36, until the first carriage 8 in train 7 engages portion P3, where the bottom portion of carriage 8 engages passage 41, and the interacting magnetic forces established between the two permanent magnets 28 of carriage 8 and two corresponding pairs 40 of permanent magnets 39 on the two disks 38 move and lock carriage 8 into a given fixed position with respect to disks 38. From this moment on, train 7 is fed along portion P3 in perfect time with the rotation of disks 38, by each pair 40 of magnets 39 acting as a timing member to time carriages 8 with disks 38 along portion P3.

Along portion P3, groups 4 of cigarettes 2 are transferred from respective pockets 9 on train 7 to wrapping unit 5, and train 7 is gradually released from timing device 36 on reaching portion P2.

The above operations are repeated cyclically.

For timing device 36 to work properly, the polarities of a permanent magnet 28 and of the two respective permanent magnets 39 facing magnet 28 in use must obviously be opposite at all times, so that the forces between magnets 28 and 39 are always of attraction and never of repulsion. This condition is met substantially at all times, by the positioning error of a train 7 of carriages 8 with respect to disks 38 being relatively small (about a few millimeters) at all times, and such as never to result in a relative position in which opposite polarities are positioned facing.

Permanent magnets 28 therefore form part of both actuating device 23, as a secondary of linear electric motor 24, and timing device 36, as a magnetic connecting means, thus reducing the number of components involved.

In an alternative embodiment not shown, conveyor 6 comprises mechanical or magnetic stop means for arresting a train 7 of carriages 8 in a given position along path P, in particular in said loading position.

In a further embodiment not shown, each carriage 8 is connected to disks 38 by mechanical connecting means, e.g. a series of pins carried by disks 38, and each of which is movable axially to engage a respective seat defined on a respective carriage 8.

Conveyor 6 as described above—for feeding a carriage 8 along a path P by means of a linear electric motor 24 comprising a primary or stator 25 located along at least one portion of path P, and a secondary or cursor 26 carried by carriage 8—may be employed in various parts of the packing machine. In particular, such a conveyor may be used to advantage for feeding an article along a path at speeds varying from one portion to another of the path, e.g. for feeding the article at constant speed (continuous operation) along one portion, and in steps (intermittent operation) along another portion. In such a conveyor, in fact, the law of motion of each carriage is independent of the position of the carriage along the path and of the law of motion of the other carriages.

What is claimed is:

1. A cigarette packing machine comprising a conveyor (6) having at least one pocket (9) for forming and conveying a respective group (4) of cigarettes (2); the machine (1) being characterized in that said conveyor (6) comprises a fixed guide (10); at least one carriage (8) running along said guide (10) and supporting said pocket (9); and a linear electric motor (24) having a stator or primary (25) located along at least a portion of the guide (10), and a cursor or secondary (26) carried by said carriage (8).

2. A machine as claimed in claim 1 and having a hopper (15) for feeding cigarettes (2) to said conveyor (6); said hopper (15) comprising a given first number (N) of outlets (18); said conveyor (6) having a number of said pockets (9) arranged in at least one train (7) comprising a given second number of pockets (9); and said first number (N) being equal to said second number.

3. A machine as claimed in claim 2, characterized in that each said train (7) comprises a said second number of carriages (8), each of which supports a respective said pocket (9) and is mechanically connected to at least one other carriage (8) in the same train (7).

4. A machine as claimed in claim 1 and having a hopper (15) for feeding cigarettes (2) to said conveyor (6); said hopper (15) comprising a given first number (N) of outlets (18); said conveyor (6) having a number of said pockets (9) arranged in at least one train (7) comprising a given second number of pockets (9); and said first number (N) being a multiple of said second number.

5. A machine as claimed in claim 1, characterized in that said conveyor (6) comprises stop means for arresting said carriage (8) in a given position along said guide (10).

6. A machine as claimed in claim 1, characterized in that said conveyor (6) comprises sensor means (30) for determining the position of said carriage (8) along at least one portion of said guide (10); said sensor means (30) comprising a reference member (31) carried by said carriage (8), and a fixed reading system (32) connected to said reference member (31).

7. A machine as claimed in claim 6, characterized in that said reference member (31) comprises optical reflecting means; and said reading system (32) comprises a laser emitter.

8. A machine as claimed in claim 6, characterized in that said reference member (31) comprises generating means (31) for generating a magnetic field, in particular a permanent magnet; and said reading system (32) comprises a bar (33) of magnetostrictive material parallel to at least one portion of said guide (10) and facing said generating means (31).

9. A machine as claimed in claim 6, characterized in that said reference member (31) comprises generating means (31) for generating a magnetic field, in particular a permanent magnet; and said reading system (32) comprises a bar (33) having magnetoresistors and located parallel to at least one portion of said guide (10) and facing said generating means (31).

10. A machine as claimed in claim 1, characterized in that said conveyor (6) comprises timing means (36) for timing said carriage (8) along a given portion (P3) of said guide (10).

11. A machine as claimed in claim 10, characterized by comprising a wrapping unit (5); and a transfer station located along said given portion (P3) of said guide (10) to transfer a said group (4) of cigarettes (2) from said pocket (9) to the wrapping unit (5).

12. A machine as claimed in claim 10, characterized in that said timing means (36) comprise a further conveyor (38) having at least one connecting means (28, 39) for establishing a connection between said carriage (8) and the further conveyor (38) to feed the carriage (8) and the further conveyor (38) forward substantially synchronously and in a given position with respect to each other.

13. A machine as claimed in claim 12, characterized in that said connecting means (28, 39) comprise first and second magnetic connecting means (28, 39) located respectively on said carriage (8) and said further conveyor (38), and for mechanically connecting the carriage (8) and the further conveyor (38) to each other in response to a magnetic field generated by at least one of said connecting means (28, 39).

14. A machine as claimed in claim 13, characterized in that at least one of said first and second magnetic connecting means (28; 39) comprises a permanent magnet (28, 39).

15. A machine as claimed in claim 13, characterized in that said first and second magnetic connecting means (28, 39) each comprise a respective permanent magnet (28, 39).

16. A machine as claimed in claim 13, characterized in that said given portion (P3) of the guide (10) is a semicircular portion; said further conveyor (38) comprising at least one powered disk (38) coaxial with the semicircular said given portion (P3) and supporting a number of permanent magnets (39).

17. A machine as claimed in claim 16, characterized in that said further conveyor (38) comprises two identical powered disks (38), each coaxial with the semicircular said given portion (P3) and supporting a number of permanent magnets (39); the two disks (38) being synchronous with each other, and being spaced axially apart to define, in between, a semicircular passage (41); said carriage (8) comprising a bottom portion, which engages said passage (41) and has at least one permanent magnet (28) which interacts with a magnetic field generated by a respective permanent magnet (39) carried by a said disk (38); and said permanent magnets (28, 39) defining said first and second magnetic connecting means (28, 39).

18. A packing machine, in particular for packing cigarettes (2), comprising at least one pocket (9) for housing at least one article (4); and a conveyor (6) for feeding the pocket (9) along a path (P); the machine (1) being characterized in that the conveyor (6) comprises a carriage (8) running along said path (P) and supporting said pocket (9); and a linear electric motor (24) comprising a primary or stator (25) located along at least one portion of said path (P), and a secondary or cursor (26) carried by said carriage (8).

19. A cigarette packing machine comprising a conveyor (6) having at least one pocket (9) for forming and conveying a respective group (4) of cigarettes (2); said conveyor (6) comprising a fixed guide (10), at least one carriage (8) running along said guide (10) and supporting said pocket (9), a linear electric motor (24) having a stator or primary (25) located along at least a portion of the guide (10), and a cursor or secondary (26) carried by said carriage (8), sensor means (30) for determining the position of said carriage (8) along at least one portion of said guide (10); said sensor means (30) comprising a reference member (31) carried by said carriage (8), and a fixed reading system (32) connected to said reference member (31); said reference member (31) comprising generating means (31) for generating a magnetic field, in particular a permanent magnet; and said reading system (32) comprising a bar (33) of magnetostrictive material parallel to at least one portion of said guide (10) and facing said generating means (31).

20. A cigarette packing machine comprising a conveyor (6) having at least one pocket (9) for forming and conveying a respective group (4) of cigarettes (2); said conveyor (6) comprising a fixed guide (10), at least one carriage (8) running along said guide (10) and supporting said pocket (9), a linear electric motor (24) having a stator or primary (25) located along at least a portion of the guide (10), and a cursor or secondary (26) carried by said carriage (8), sensor means (30) for determining the position of said carriage (8) along at least one portion of said guide (10); said sensor means (30) comprising a reference member (31) carried by said carriage (8), and a fixed reading system (32) connected to said reference member (31); said reference member (31) comprising generating means (31) for generating a magnetic field, in particular a permanent magnet; and said reading system (32) comprising a bar (33) having magnetoresistors and located parallel to at least one portion of said guide (10) and facing said generating means (31).

21. A cigarette packing machine comprising a conveyor (6) having at least one pocket (9) for forming and conveying a respective group (4) of cigarettes (2); said conveyor (6) comprising a fixed guide (10), at least one carriage (8) running along said guide (10) and supporting said pocket (9), a linear electric motor (24) having a stator or primary (25) located along at least a portion of the guide (10), and a cursor or secondary (26) carried by said carriage (8), and timing means (36) for timing said carriage (8) along a given portion (P3) of said guide (10); said timing means (36) comprising a further conveyor (38) having at least one connecting means (28, 39) for establishing a connection between said carriage (8) and the further conveyor (38) to feed the carriage (8) and the further conveyor (38) forward substantially synchronously and in a given position with respect to each other; said connecting means (28, 39) comprising first and second magnetic connecting means (28, 39) located respectively on said carriage (8) and said further conveyor (38), and for mechanically connecting the carriage (8) and the further conveyor (38) to each other in response to a magnetic field generated by at least one of said connecting means (28, 39); at least one of said first and second magnetic connecting means (28, 39) comprising a permanent magnet (28, 39); said given portion (P3) of the guide (10) being a semicircular portion; said further conveyor (38) comprising at least one powered disk (38) coaxial with the semicircular said given portion (P3) and supporting a number of permanent magnets (39); said further conveyor (38) comprising two identical powered disks (38), each coaxial with the semicircular said given portion (P3) and supporting a number of permanent magnets (39); the two disks (38) being synchronous with each other, and being spaced axially apart to define, in between, a semicircular passage (41); said carriage (8) comprising a bottom portion, which engages said passage (41) and has at least one permanent magnet (28) which interacts with a magnetic field generated by a respective permanent magnet (39) carried by a said disk (38); and said permanent magnets (28, 39) defining said first and second magnetic connecting means (28, 39).

* * * * *